United States Patent
Kosaka et al.

(10) Patent No.: US 7,669,043 B2
(45) Date of Patent: Feb. 23, 2010

(54) MEMORY PARAMETER INITIALIZATION BASED ON A TEMPERATURE ACQUIRED AT STARTUP

(75) Inventors: Hiroyuki Kosaka, Kawasaki (JP); Naoki Iwasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 388 days.

(21) Appl. No.: 11/236,627

(22) Filed: Sep. 28, 2005

(65) Prior Publication Data

US 2006/0018203 A1 Jan. 26, 2006

Related U.S. Application Data

(63) Continuation of application No. PCT/JP03/06121, filed on May 16, 2003.

(51) Int. Cl.
  *G06F 15/177* (2006.01)
  *G06F 9/00* (2006.01)
  *G06F 1/24* (2006.01)
  *G06F 13/00* (2006.01)

(52) U.S. Cl. .............................. 713/1; 713/2; 713/100; 711/1

(58) Field of Classification Search ............... 713/1, 713/2, 100; 711/100
See application file for complete search history.

(56) References Cited

U.S. PATENT DOCUMENTS

| | | | | |
|---|---|---|---|---|
| 5,894,446 A * | 4/1999 | Itou | ........................... | 365/222 |
| 5,956,350 A * | 9/1999 | Irrinki et al. | ................. | 714/718 |
| 5,974,546 A * | 10/1999 | Anderson | ....................... | 713/2 |
| 6,078,455 A * | 6/2000 | Enarson et al. | ............... | 360/68 |
| 6,141,280 A * | 10/2000 | Cho | ........................... | 365/222 |
| 6,351,147 B1 * | 2/2002 | Renner et al. | ................. | 326/82 |
| 6,560,725 B1 * | 5/2003 | Longwell et al. | ............... | 714/54 |
| 6,654,310 B2 * | 11/2003 | Nam | ..................... | 365/230.06 |
| 6,662,136 B2 * | 12/2003 | Lamb et al. | ................. | 702/132 |
| 6,732,264 B1 * | 5/2004 | Sun et al. | ........................ | 713/2 |
| 7,126,778 B2 * | 10/2006 | Lamberts | ..................... | 360/69 |
| 7,177,219 B1 * | 2/2007 | Herbert et al. | ............... | 365/211 |
| 7,233,880 B2 * | 6/2007 | Coulson et al. | ............. | 702/186 |
| 7,260,007 B2 * | 8/2007 | Jain et al. | .................... | 365/212 |
| 7,305,518 B2 * | 12/2007 | Zeighami et al. | ............ | 711/106 |
| 2005/0071705 A1 * | 3/2005 | Bruno et al. | ................ | 713/500 |
| 2005/0190622 A1 * | 9/2005 | Choi | .......................... | 365/212 |
| 2006/0161375 A1 * | 7/2006 | Duberstein et al. | .......... | 702/132 |
| 2007/0008798 A1 * | 1/2007 | Hokenmaier et al. | ........ | 365/222 |

FOREIGN PATENT DOCUMENTS

| | | |
|---|---|---|
| JP | 62-247417 | 10/1987 |
| JP | 6-348581 | 12/1994 |

(Continued)

OTHER PUBLICATIONS

International Search Report dated Jul. 22, 2003 in corresponding PCT Patent Application No. PCT/JP03/06121 (Japanese and English translation).

*Primary Examiner*—Ji H Bae
(74) *Attorney, Agent, or Firm*—Staas & Halsey LLP

(57) ABSTRACT

A method of initializing memory parameters of a main storage device at a time of starting an information processing apparatus includes acquiring a temperature at the time of starting the information processing apparatus; and initializing the memory parameters based on the temperature.

4 Claims, 8 Drawing Sheets

FOREIGN PATENT DOCUMENTS

| | | |
|---|---|---|
| JP | 07-320018 | 12/1995 |
| JP | 08-114785 | 5/1996 |
| JP | 08-137783 | 5/1996 |
| JP | 2001-318828 | 11/2001 |
| JP | 2002-149281 | 5/2002 |

* cited by examiner

FIG.3

| | FIRST SET VALUE | SECOND SET VALUE | THIRD SET VALUE |
|---|---|---|---|
| HIGH-TEMPERATURE THRESHOLD 3 | HIGH-TEMPERATURE MEMORY PARAMETER 31 | HIGH-TEMPERATURE MEMORY PARAMETER 32 | HIGH-TEMPERATURE MEMORY PARAMETER 33 |
| HIGH-TEMPERATURE THRESHOLD 2 | HIGH-TEMPERATURE MEMORY PARAMETER 21 | HIGH-TEMPERATURE MEMORY PARAMETER 23 | HIGH-TEMPERATURE MEMORY PARAMETER 23 |
| HIGH-TEMPERATURE THRESHOLD 1 | HIGH-TEMPERATURE MEMORY PARAMETER 11 | HIGH-TEMPERATURE MEMORY PARAMETER 12 | HIGH-TEMPERATURE MEMORY PARAMETER 13 |
| NORMAL TEMPERATURE | NORMAL-TEMPERATURE MEMORY PARAMETER 01 | NORMAL-TEMPERATURE MEMORY PARAMETER 02 | NORMAL-TEMPERATURE MEMORY PARAMETER 03 |
| LOW-TEMPERATURE THRESHOLD 1 | LOW-TEMPERATURE MEMORY PARAMETER 11 | LOW-TEMPERATURE MEMORY PARAMETER 12 | LOW-TEMPERATURE MEMORY PARAMETER 13 |
| LOW-TEMPERATURE THRESHOLD 2 | LOW-TEMPERATURE MEMORY PARAMETER 21 | LOW-TEMPERATURE MEMORY PARAMETER 22 | LOW-TEMPERATURE MEMORY PARAMETER 23 |
| LOW-TEMPERATURE THRESHOLD 3 | LOW-TEMPERATURE MEMORY PARAMETER 31 | LOW-TEMPERATURE MEMORY PARAMETER 32 | LOW-TEMPERATURE MEMORY PARAMETER 33 |

… (1)

MEMORY PARAMETER INITIALIZATION BASED ON A TEMPERATURE ACQUIRED AT STARTUP

This application is a continuation application, filed under 35 USC 111(a), of International Application PCT/JP03/06121, filed May 16, 2003 and incorporated by reference herein.

BACKGROUND OF THE INVENTION

1. Field of the Invention

The present invention relates to a technology for ensuring a stable operation of an information processing apparatus by setting suitable memory parameters when activating at low and high temperature environments.

2. Description of the Related Art

Conventionally, there are initializing apparatuses that initialize memory parameters of a main storage device when activating an information processing apparatus. Before activating an operating system and setting the memory parameters of the main storage device, the initializing apparatus initializes preset fixed values as the memory parameters of the main storage device and activates the information processing apparatus.

In general information processing apparatuses, even within a guaranteed temperature range, setting of the memory parameter of the main storage device is not suitable for low-temperature or high-temperature environments. Therefore, operational errors frequently occur in accessing the memory when activating or during operation, so that the device does not activate. For example, Japanese Patent Application Laid-Open No. S62-247417 discloses a technique of, when the temperature at the time of activating the information processing apparatus is lower than a guaranteed temperature, stably activating a program when the temperature of the information processing apparatus reaches a preset temperature.

However, since the conventional technique is used for stably activating the program when the temperature of the information processing apparatus deviates from the range of the guaranteed temperature, and since memory parameter settings for the main storage device are not suitable for low-temperature or high-temperature environments even though the information processing apparatus is within the range of the guaranteed temperature, operational errors in accessing the memory occur at the time of activating or during operation so that the problem of failed activation remains unsolved.

SUMMARY OF THE INVENTION

It is an object of the present invention to at least solve the problems in the conventional technology.

A method according to one aspect of the present invention, which is for initializing memory parameters of a main storage device at a time of starting an information processing apparatus, includes acquiring a temperature at the time of starting the information processing apparatus; and initializing the memory parameters based on the temperature.

A computer-readable recording medium according to another aspect of the present invention stores a computer program that causes a computer to execute the above method according to the present invention.

An information processing apparatus according to still another aspect of the present invention, which initializes memory parameters of a main storage device at a time of starting, includes a temperature acquiring unit that acquires a temperature at the time of starting; and a memory-parameter initializing unit that initializes the memory parameters based on the temperature.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of threshold-memory-parameter correlating-data set by the initializing apparatus shown in FIG. 2;

DETAILED DESCRIPTION OF THE PREFERRED EMBODIMENTS

Exemplary embodiments of an initializing apparatus, an initializing method, an initializing program, and an information processing apparatus according to the present invention will be explained in detail below with reference to the accompanying drawings.

Figure 1:
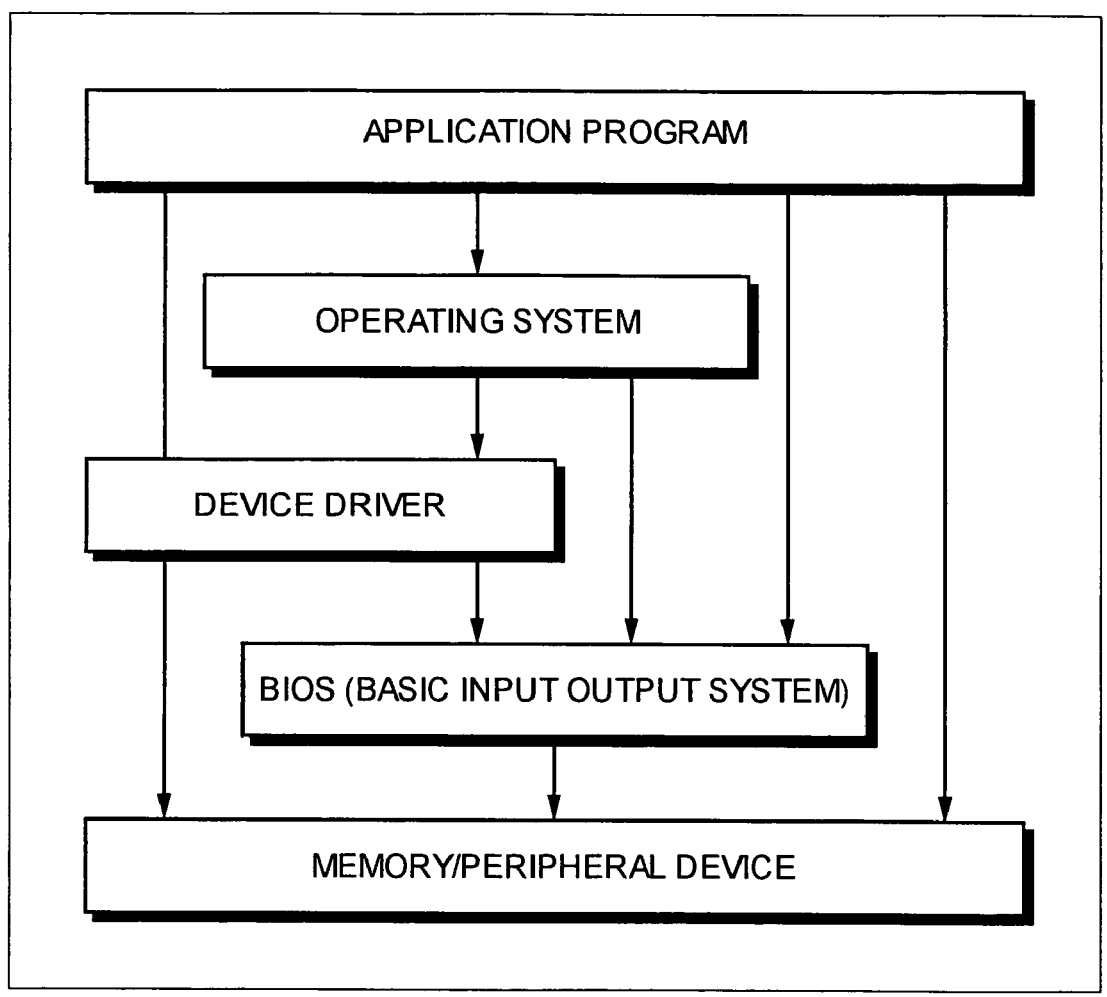
FIG. 1 is a schematic of a software configuration of an information processing apparatus according to a first embodiment of the present invention.

FIG. 1 is a schematic of concepts of the software configuration of the information processing apparatus according to the first embodiment. As shown in FIG. 1, in order to execute application software based on requests from users, functions of the information processing apparatus are divided among a system software group that includes a basic input output system (BIOS), a device driver, an operating system, and the like. The BIOS has a power on self test (POST) processing function of initializing peripheral devices such as a main storage device, a hard disk drive (HDD), a keyboard, and a display, at the time of activating the information processing apparatus and before the operating system and the device driver become operational.

The POST processing function is particularly important in ensuring stable activation of the main storage device by setting its memory parameters such as latency and strength. Specifically, the POST processing function is used to initialize the memory parameters in the register of a main storage controller of the main storage device.

Latency is a clock number used in obtaining synchronism when data has been sent to the main storage device, the clock number increasing as the temperature decreases or increases. Accordingly, the BIOS acquires the temperature of the information processing apparatus and sets the clock number to a higher number when the temperature is low or high, thereby obtaining synchronism and enabling the main storage device to operate stably. Strength is a set value relating to the waveform formation of the memory line of the main storage device, the rise of the memory line waveform decaying as the temperature decreases or increases. Accordingly, the BIOS acquires the temperature of the information processing apparatus and adjusts the strength at a high or low temperature, thereby stably operating the main storage device.

Thus, according to the first embodiment, the temperature is acquired at the time of activating the information processing apparatus, and memory parameters such as strength and latency are set based on the temperature. By setting these memory parameters to suit low or high temperature at the time of activation, the information processing apparatus can be operated stably.

Figure 2:
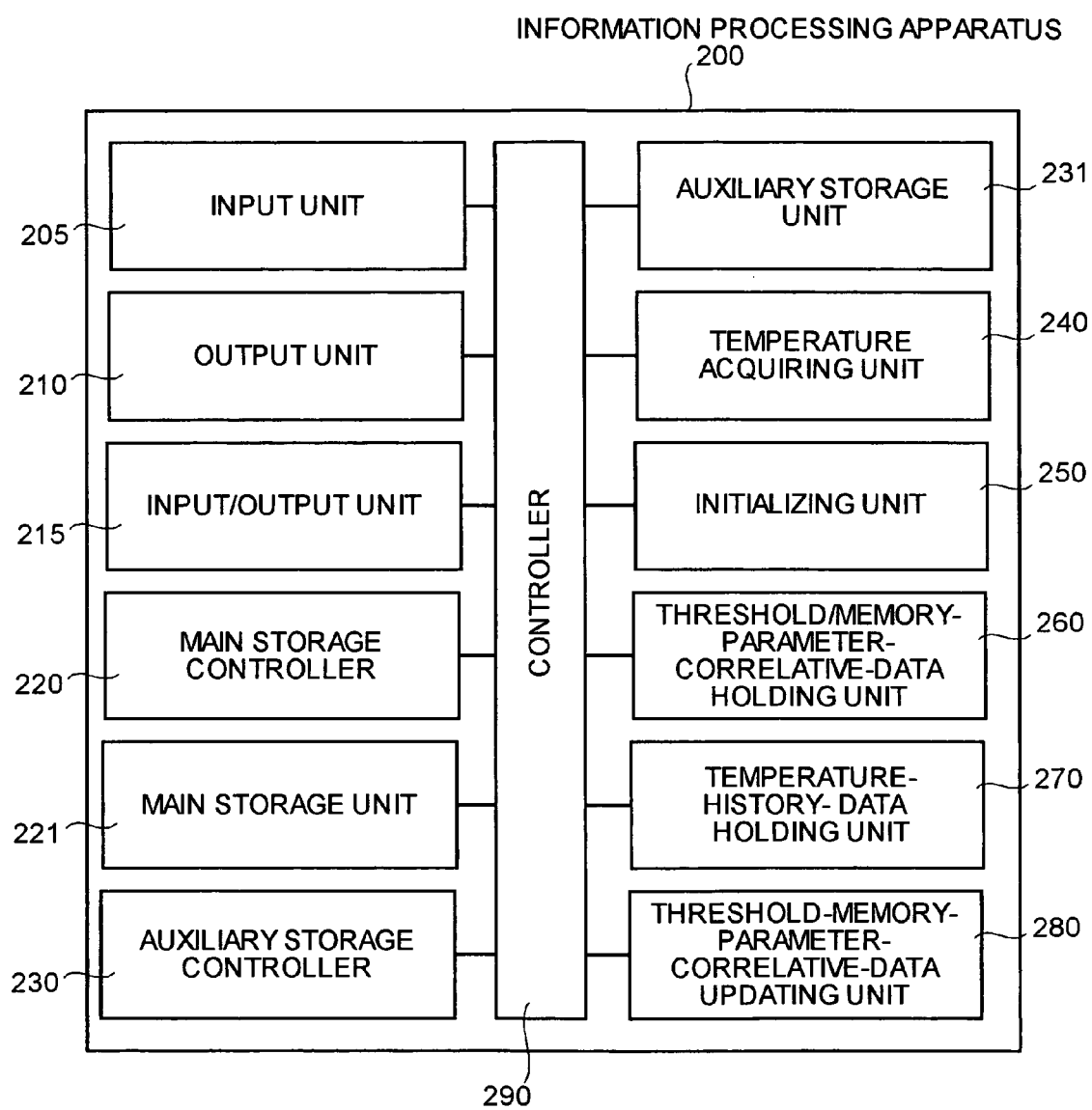
FIG. 2 is a block diagram of the functional configuration of the information processing apparatus at the time of activating an initializing apparatus according to the first embodiment.

FIG. 2 is a block diagram of the functional configuration of the information processing apparatus at the time of activating the initializing apparatus according to the first embodiment. As shown in FIG. 2, an information processing apparatus 200 includes an input unit 205, an output unit 210, an input/output unit 215, a main storage controller 220, a main storage unit 221, an auxiliary storage controller 230, an auxiliary storage unit 231, a temperature acquiring unit 240, an initializing unit 250, a threshold-memory-parameter correlating-data holding unit 260, a temperature-history-data holding unit 270, a threshold-memory-parameter correlating-data updating unit 280, and a controller 290.

The input unit 205 is a processor that inputs data and request instructions from users to the information processing apparatus, and specific examples thereof include a keyboard, a mouse, a touch pen, and the like. The output unit 210 is a processor that outputs and displays processed results of the information processing apparatus, and specifically, it is an image display device such as a cathode ray tube (CRT) and a liquid crystal display (LCD), a printer, or the like. The input/output unit 215 inputs/outputs data, and specifically, includes a flexible disk drive (FDD) and a serial parallel interface.

The main storage controller 220 is a processor that controls the input/output of data to/from the main storage unit 221. The main storage unit 221 stores data and programs, and specifically, it is a memory that electrically stores data such as a dynamic random access memory (DRAM), and has high data access speed although the data is erased when the power is turned off. The auxiliary storage controller 230 is a processor that controls input/output of data to/from the auxiliary storage unit 231. The auxiliary storage unit 231 stores data and programs, and specifically, it is a memory that stores data by magnetism, such as an HDD, and has slow data access speed although data is retained even when the power is turned off.

The temperature acquiring unit 240 is a processor that acquires the temperature at the time of activating the information processing apparatus, and specifically, includes a temperature processing circuit and a temperature sensor for measuring temperature. For example, the temperature is measured by attaching a thermistor or a platinum sensor to a circuit board of a central processing unit (CPU). The initializing unit 250 sets memory parameters of the main storage device based on the temperature. Specifically, the initializing unit 250 sets memory parameters that are updated based on a temperature history held in the temperature-history-data holding unit 270.

The threshold-memory-parameter correlating-data holding unit 260 is a storage unit that holds threshold-memory-parameter correlating-data, created by correlating the memory parameters with thresholds of the temperature at the time of activating the information processing apparatus. The temperature-history-data holding unit 270 is a storage unit that holds temperature histories relating to previous cases when the information processing apparatus did not operate normally.

FIG. 3 is an example of the threshold-memory-parameter correlating-data set by the initializing apparatus shown in FIG. 2. As shown in FIG. 3, the threshold-memory-parameter correlating-data includes a first set value, a second set value, and a third set value, which are set for each temperature threshold increasing from low-temperature threshold 3, low-temperature threshold 2, low-temperature threshold 1, normal temperature, high-temperature threshold 1, high-temperature threshold 2, and high-temperature threshold 3. In addition to temperature dependency, variation in the settings of the memory parameters is taken into consideration. The initializing apparatus acquires the set values of the memory parameters that did not operate normally in the past from the temperature history data, and selects and sets memory parameters other than these set values.

For example, when the guaranteed temperature of the information processing apparatus is between −20° C. and 50° C., the memory parameters are set to suit the temperature ranges, with low-temperature threshold 3 set to less than −10° C., low-temperature threshold 2 set to less than 0° C., low-temperature threshold 1 set to less than 10° C., normal temperature set to between 10° C. and 20° C., high-temperature threshold 1 set to greater than 20° C., high-temperature threshold 2 set to greater than 30° C., and high-temperature threshold 3 set to greater than 40° C. These memory parameters are set based on data acquired in temperature tests performed when the information processing apparatus is developed.

The threshold-memory-parameter correlating-data updating unit 280 is a processor that updates threshold-memory-parameter correlating-data that is held by the threshold-memory-parameter correlating-data holding unit 260, based on temperature histories stored in the temperature-history-data holding unit 270. The controller 290 is a processor that controls the entire information processing apparatus 200 by receiving requests from users and controlling the flow of data between the various processors.

Figure 4:
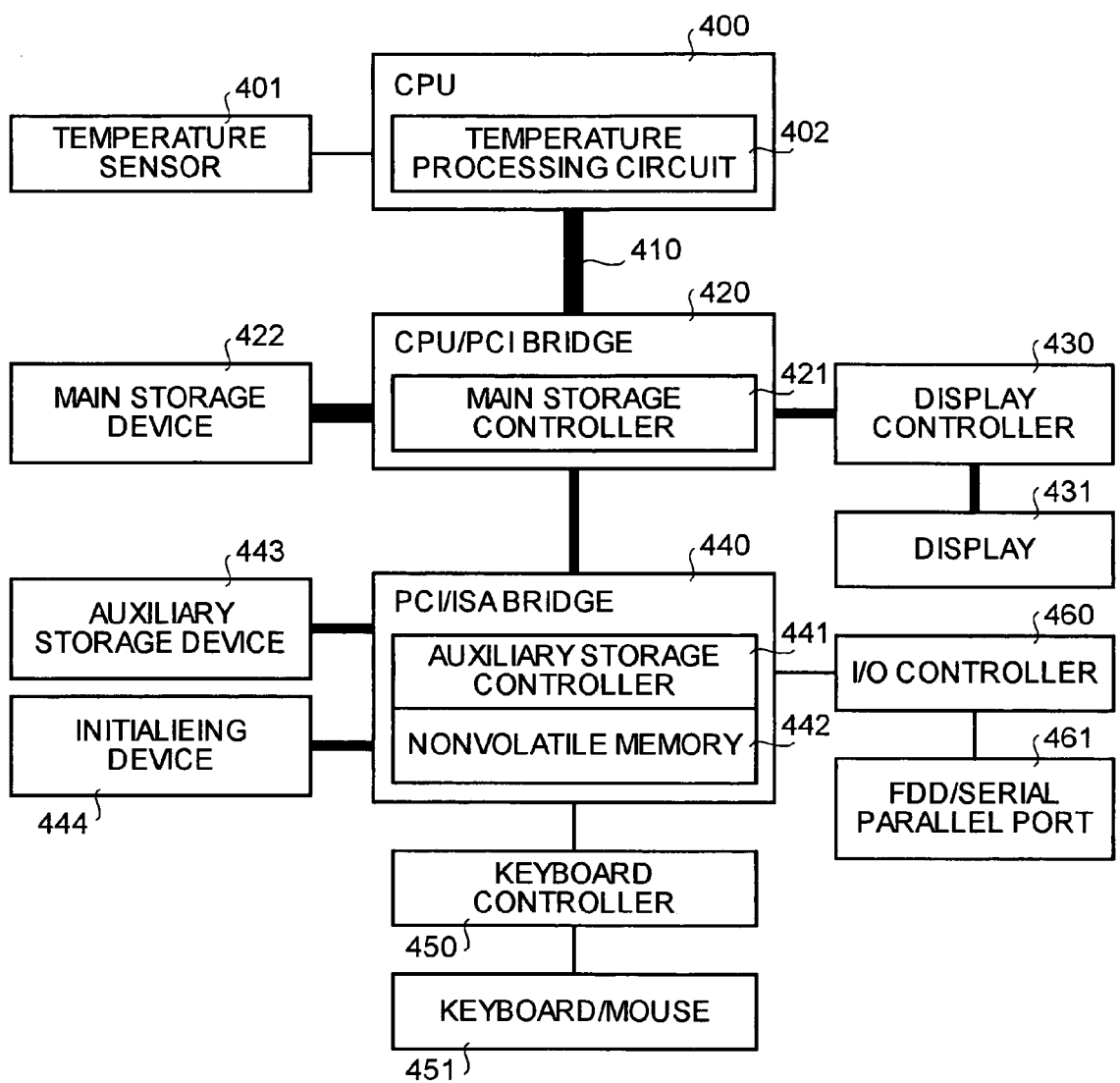
FIG. 4 depicts the hardware configuration of the information processing apparatus at the time of activating the initializing apparatus shown in FIG. 2.

FIG. 4 depicts the hardware configuration of the information processing apparatus at the time of activating the initializing apparatus shown in FIG. 2. As shown in FIG. 4, the information processing apparatus 200 includes a CPU 400, a bus 410, a CPU/PCI bridge 420, a main storage device 422, a display controller 430, a display 431, a PCI/ISA bridge 440, an auxiliary storage device 443, an initializing apparatus 444, a keyboard controller 450, a keyboard/mouse 451, an I/O controller 460, and an FDD/serial parallel port 461.

The CPU 400 is a processor that controls the entire information processing apparatus 200 by reading commands from memories of the main storage device 422 and other devices, and executing operations described in the commands. Specifically, the CPU 400 includes a temperature sensor 401 and a temperature processing circuit 402. Examples of the temperature sensor 401 are a thermistor and a platinum sensor, and specifically, it is attached to the circuit board of the CPU 400 and measures the temperature. The temperature processing circuit 402 digitally processes a signal output from the temperature sensor 401 and converts it to a temperature.

The bus 410 is a transmission path for exchanging commands and data between the constituent elements of the information processing apparatus, and is generally divided into a high-speed bus that links the CPU 400 to the main storage device 422, a high-speed peripheral component interconnect (PCI) bus that links fast peripheral devices such as the display 431, the auxiliary storage device 443, and the initializing apparatus 444, and a low-speed industrial standard architecture (ISA) bus that links slow peripheral devices such as the keyboard/mouse 451 and the FDD/serial parallel port 461.

The CPU/PCI bridge 420 is a bridge circuit that controls the main storage device 422 and the like, and connects the high-speed bus to the high-speed PCI bus. Specifically, the CPU/PCI bridge 420 includes a main storage controller 421. The main storage controller 421 is a processor that controls the operation of the main storage device 422, and specifically, controls the operation of the main storage device 422 based on memory parameters such as latency and strength, set in a register of the main storage controller 421.

The display controller 430 controls the output of data from the display 431. The display 431 displays data output by the information processing apparatus 200. The auxiliary storage device 443 is a magnetic recording system auxiliary storage device, and stores operating systems, application software, and the like. The initializing apparatus 444 initializes the main storage device 422 and peripheral devices at the time of activating the information processing apparatus.

The PCI/ISA bridge 440 is a bridge circuit that controls the auxiliary storage device 443 and the like, and connects the high-speed PCI bus to the low-speed ISA bus, and specifically, includes an auxiliary storage controller 441 and a nonvolatile memory 442. The auxiliary storage controller 441 is a processor that controls the operation of the auxiliary storage device. The nonvolatile memory 442 is a storage unit with a small-capacity of approximately 256 bytes, and specifically stores threshold-memory-parameter correlating-data and temperature history data.

The keyboard controller 450 controls the input of data by using the keyboard/mouse based on a universal serial bus (USB) interface. The keyboard/mouse 451 is used for inputting data to the information processing apparatus. The I/O controller 460 controls the input/output of data to/from peripheral devices that connect to an FDD/serial parallel port. The FDD/serial parallel port 461 is used for connecting a flexible disk or peripheral devices.

Figure 5:
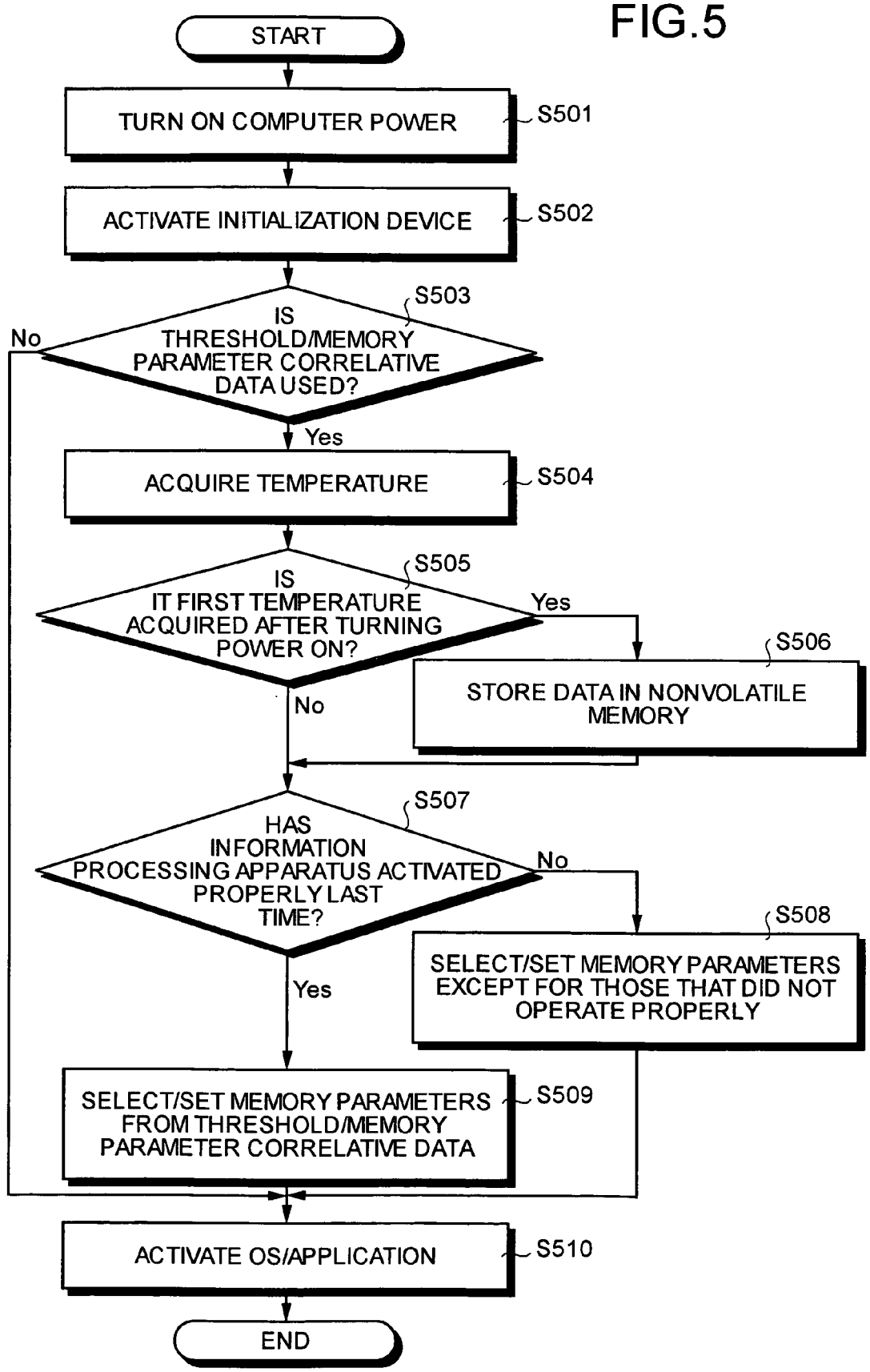
FIG. 5 is a flowchart of processing procedures for modifying memory parameter settings based on temperature measurements at the time of activating the initializing apparatus shown in FIG. 2.

FIG. 5 is a flowchart of processing procedures for modifying memory parameter settings based on temperature measurements at the time of activating the initializing apparatus shown in FIG. 2.

Figure 6:
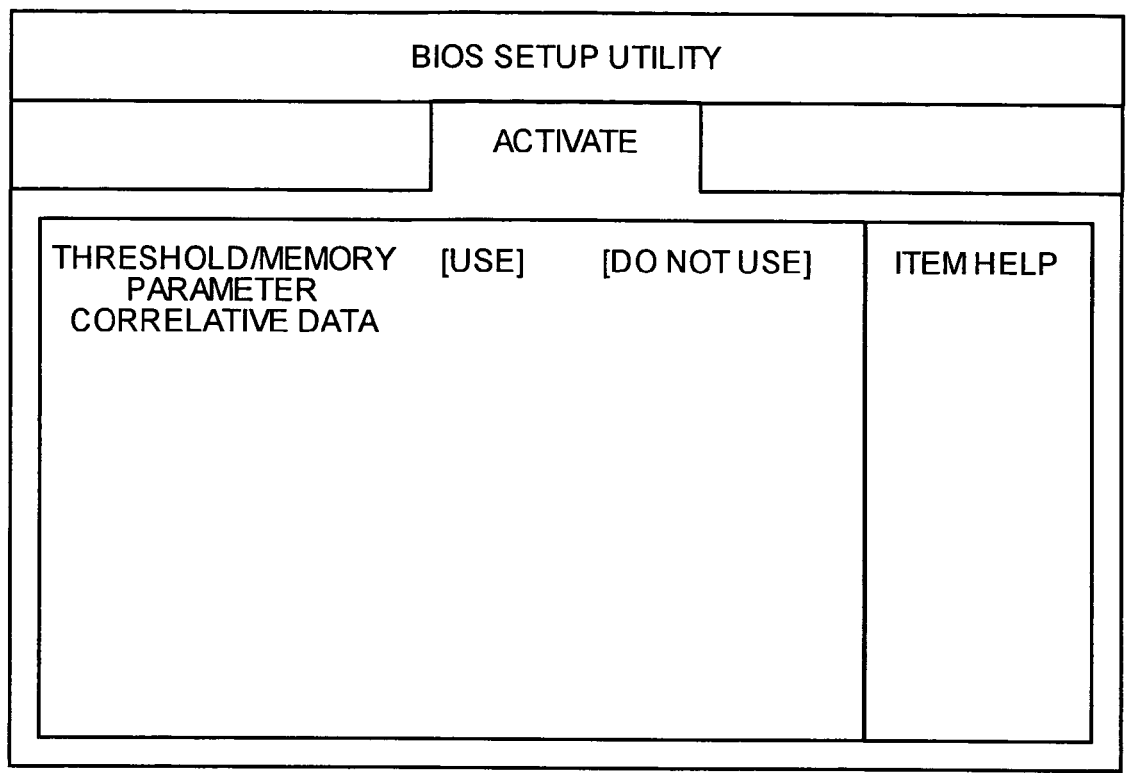
FIG. 6 is an example of a mode setting screen at the time of activating the initializing apparatus shown in FIG. 2.

When the power of the information processing apparatus 200 is turned on (step S501), the initializing apparatus 444 becomes active (step S502). At this time, a mode setting screen such as that shown in FIG. 6 appears. When the item "use" is selected in the threshold-memory-parameter correlating-data, the threshold-memory-parameter correlating-data shown in FIG. 6 becomes valid, and when "do not use" is selected, a default value is set. The user selects whether to use the threshold-memory-parameter correlating-data (step S503). When no threshold-memory-parameter correlating-data is selected as the memory parameter (step S503: No), the initializing apparatus 444 sets the default value as the memory parameter, and processing proceeds to activate an OS/application. On the other hand, when the threshold-memory-parameter correlating-data is selected as the memory parameter (step S503: Yes), the initializing apparatus 444 acquires a temperature from the temperature sensor 401 (step S504).

In order to determine whether the temperature measurement is the first temperature acquired after turning on the power, the temperature-history-data holding unit 270 is checked (step S505). Accordingly, when the temperature measurement is the first temperature acquired after turning on the power (step S505: Yes), the acquired temperature is stored in the nonvolatile memory 442 i.e., the temperature-history-data holding unit 270 (step S506). When the temperature measurement is not the first temperature acquired after turning on the power (step S505: No), the initializing apparatus 444 checks whether the information processing apparatus has activated properly the previous time (step S507).

Accordingly, when the information processing apparatus 200 has not operated properly the previous time (step S507: No), memory parameters are selected from the threshold-memory-parameter correlating-data stored in the threshold-memory-parameter correlating-data holding unit 260, to remove those at which the information processing apparatus did not operate properly, and are set in the register of the main storage controller 220 (step S508). The operating system/application is then activated (step S510). At this time, the threshold-memory-parameter correlating-data is updated to remove the memory parameters at which the information processing apparatus did not operate properly the previous time.

On the other hand, when the information processing apparatus 200 has operated properly the previous time (step S507: Yes), the acquired temperature and the memory parameters in the threshold-memory-parameter correlating-data holding unit 260 that are suitable for that temperature are selected, and set in the register of the main storage controller 220 (step S509). The operating system/application is then activated (step S510).

As described above, according to the first embodiment, the temperature at the time of activating the information processing apparatus is acquired, and the memory parameters for the main storage device are set based on this temperature. By setting memory parameters that are suitable for a low-temperature or high-temperature environment in this manner, the information processing apparatus can operate stably.

By storing threshold-memory-parameter correlating-data, which correlates thresholds for temperature at the time of activating the information processing apparatus with the memory parameters, memory parameters that are suitable for a low-temperature or high-temperature environment can be set, thereby operating the information processing apparatus stably.

By storing temperature histories of cases when the information processing apparatus has not operated properly, highly reliably memory parameters backed up by a past temperature history data can be set, thereby operating the information processing apparatus stably.

By updating the threshold-memory-parameter correlating-data based on the temperature history, highly reliable memory parameters backed up by a past temperature history data can be set, thereby operating the information processing apparatus stably.

The initializing apparatus and the initializing method described according to the first embodiment can be realized by making a computer system, such as a personal computer or a work station, execute a program prepared beforehand. According to a second embodiment of the present invention, an information processing apparatus that executes an initializing program having the same functions as the initializing apparatus explained according to the first embodiment will be explained.

Figure 7:
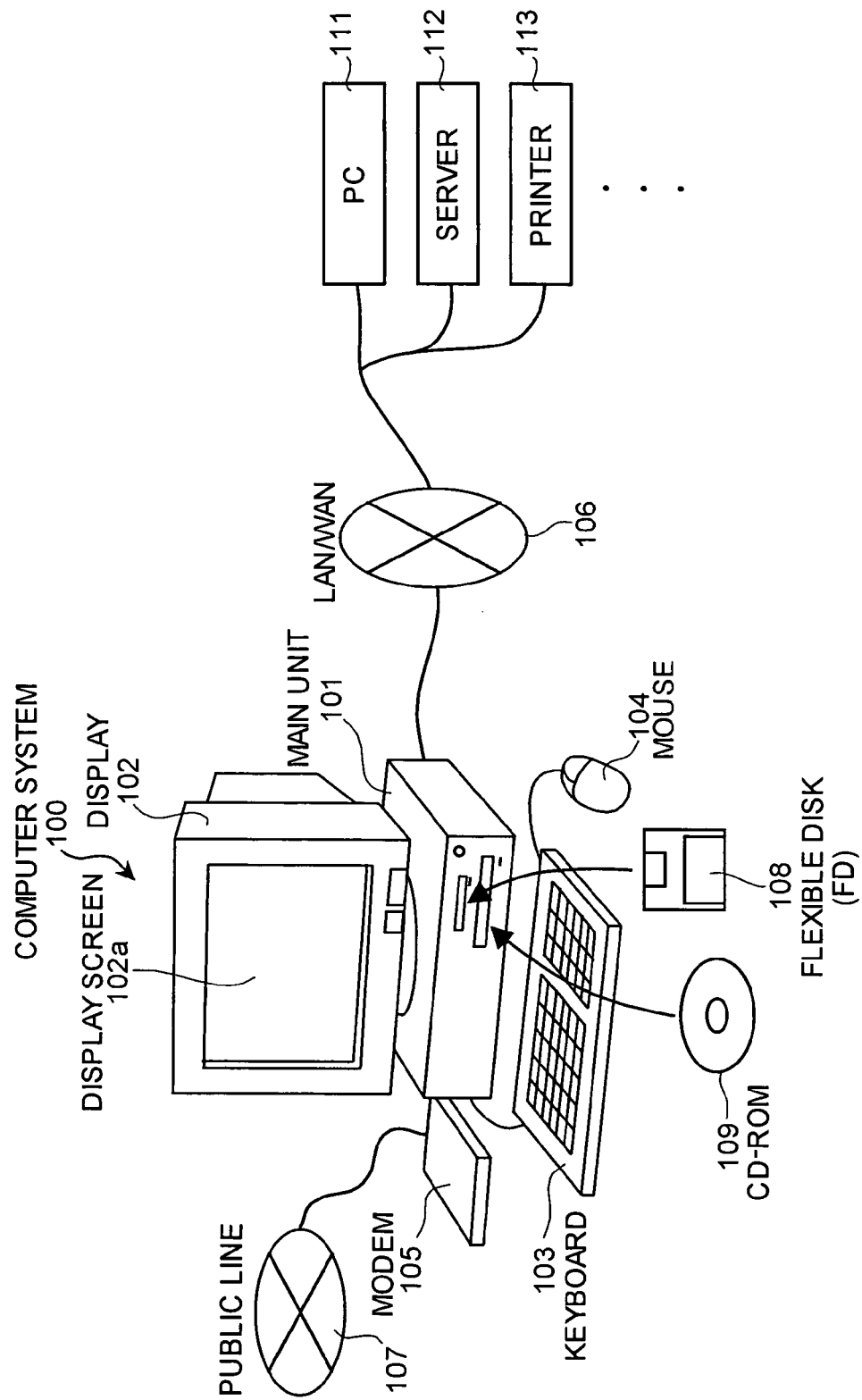
FIG. 7 is a system configuration diagram of an information processing apparatus according to a second embodiment of the present invention.
Figure 8:
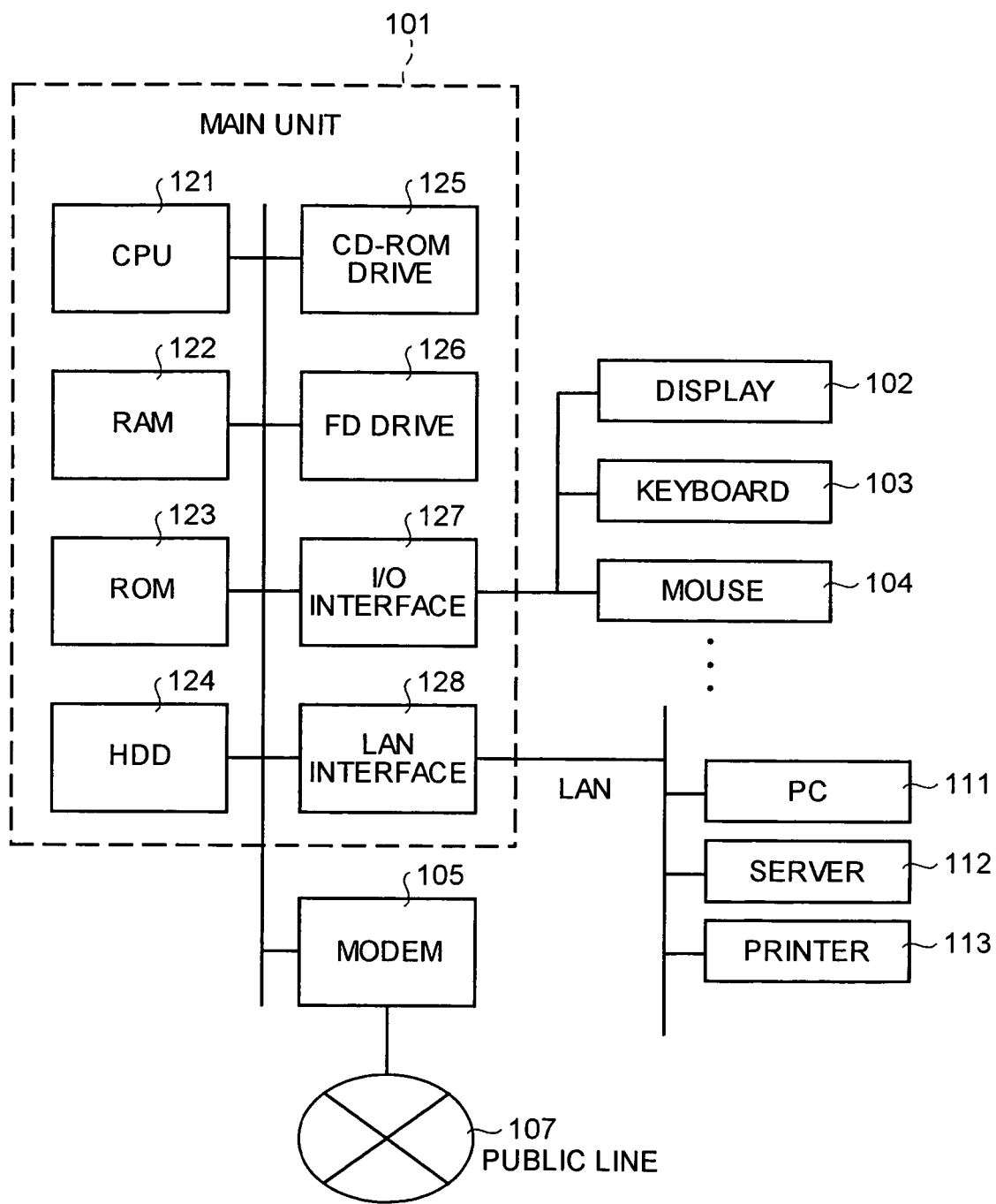
FIG. 8 is a block diagram of the configuration of a main unit in the information processing apparatus shown in FIG. 7.

FIG. 7 is a system configuration diagram of the information processing apparatus according to the second embodiment, and FIG. 8 is a block diagram of the configuration of a main unit in the computer system. As shown in FIG. 7, a computer system 100 according to the second embodiment includes a main unit 101, a display 102 that displays information such as images on a display screen 102a according to an instruction from the main unit 101, a keyboard 103 for inputting various information to the computer system 100, and a mouse 104 for specifying an arbitrary position on the display screen 102a of the display 102.

As shown in FIG. 8, the main unit 101 in the computer system 100 includes a CPU 121, a RAM 122, a read only memory (ROM) 123, a HDD 124, a CD-ROM drive 125 that accepts a CD-ROM 109, a flexible disk (FD) drive 126 that accepts a flexible disk 108, an I/O interface 127 that connects the display 102, the keyboard 103, and the mouse 104, and a local area network (LAN) interface 128 that connects to a local area network or a wide area network (LAN/WAN) 106.

The computer system 100 is connected to a modem 105 for connecting to a public line 107 such as the Internet, and to another computer system (PC) 111, a server 112, a printer 113, and the like, via the LAN interface 128 and the LAN/WAN 106.

The computer system 100 realizes the initializing apparatus by reading and executing an initializing program stored in a predetermined recording medium. The predetermined recording medium may be any type of recording medium that stores an initializing program that can be read by the computer system 100, including a "portable physical medium" such as the FD 108, the CD/ROM 109, an magneto-optical (MO) disk, a digital versatile disk (DVD), an optical magnetic disk, and an integrated circuit (IC) card, a "fixed physical medium" such as the HDD 124, the RAM 122, and the ROM 123, and a "communication medium" that stores the program for a short period at the time of transmitting it, such as the public line 107 connected via the modem 105, and the LAN/WAN 106 that connects to another computer system 111 and the server 112.

The initializing program is stored in a recording medium such as the "portable physical medium", the "fixed physical medium", or the "communication medium", so as to be read by a computer, and the computer system 100 realizes the initializing apparatus and an information reproduction method by reading the initializing program from the recording medium and executing it. The initializing program is not necessarily executed by the computer system 100, and may be executed by the other computer system 111 or the server 112, or executed by both in a cooperative manner, while applying the present invention in the same manner.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of initializing memory parameters of a main storage device at a time of starting an information processing apparatus, the method comprising:
   acquiring a temperature at the time of starting the information processing apparatus; initializing the memory parameters based on threshold-memory-parameter correlating-data, which correlates a threshold of the temperature at the time of starting the information processing apparatus with the memory parameters and the temperature;
   holding a temperature history; and
   updating the threshold-memory-parameter correlating-data to remove those memory parameters at which the information processing apparatus has been malfunctioning from the threshold-memory-parameter correlating-data-based on the temperature history.

2. A computer-readable recording medium that stores a computer program for initializing memory parameters of a main storage device at a time of starting an information processing apparatus, wherein the computer program causes a computer to execute:
   acquiring a temperature at the time of starting the information processing apparatus; initializing the memory of parameters based on threshold-memory-parameter correlating-data, which correlates a threshold of the temperature at the time of starting the information processing apparatus with the memory parameters, and temperature;
   holding a temperature history; and
   updating the threshold-memory-parameter correlating-data to remove those memory parameters at which the information processing apparatus has been malfunctioning from the threshold-memory-parameter correlating-data based on the temperature history.

3. An information processing apparatus the initializes memory parameters of a main storage device at a time of starting, the information processing apparatus comprising:
   a temperature acquiring unit that acquires a temperature at the time of starting;
   a threshold-memory-parameter and correlating-data unit that holds threshold-memory-parameter and correlating-data that correlates a threshold of the temperature at the time of starting the information processing apparatus with the memory parameters;
   a memory-parameter initializing unit that initializes the memory parameters based on the threshold-memory-parameter correlating-data and the temperature;
   a temperature-history-data holding unit that holds a temperature history; and
   a threshold-memory-parameter correlating data updating unit that updates the threshold-memory-parameter correlating-data to remove those memory parameters at which the information processing apparatus has been malfunctioning from the threshold-memory-parameter correlating-data based on the temperature history.

4. A method of initializing memory parameters of a storage of an information processing apparatus, the method comprising:
   acquiring a temperature at a time of starting the information processing apparatus;
   determining if the information processing apparatus properly activated at a last activation; and
   selecting and setting the memory parameters based on threshold-memory-parameter correlating-data and the temperature based on the determining,
   the selecting further comprising selecting and setting only those memory parameters at which the information processing apparatus did properly operate and not selecting and setting those memory parameters at which the information processing apparatus did not properly operate.

* * * * *